US008928554B2

(12) United States Patent
Hine

(10) Patent No.: US 8,928,554 B2
(45) Date of Patent: Jan. 6, 2015

(54) MOBILE IMAGE DISPLAY SYSTEM

(75) Inventor: Laurence John Hine, Chilliwack (CA)

(73) Assignee: IC Media Technology, Inc., Chilliwack (CA)

( * ) Notice: Subject to any disclaimer, the term of this patent is extended or adjusted under 35 U.S.C. 154(b) by 136 days.

(21) Appl. No.: 13/522,815

(22) PCT Filed: Jan. 18, 2011

(86) PCT No.: PCT/CA2011/000053
§ 371 (c)(1),
(2), (4) Date: Jul. 18, 2012

(87) PCT Pub. No.: WO2011/088551
PCT Pub. Date: Jul. 28, 2011

(65) Prior Publication Data
US 2012/0293393 A1 Nov. 22, 2012

Related U.S. Application Data

(60) Provisional application No. 61/296,573, filed on Jan. 20, 2010.

(51) Int. Cl.
G09G 5/00 (2006.01)
G06F 3/041 (2006.01)
G09F 9/30 (2006.01)
B65G 15/00 (2006.01)
G09F 19/22 (2006.01)
G09F 11/12 (2006.01)
G09F 11/26 (2006.01)
G09F 19/02 (2006.01)
G09F 21/00 (2006.01)

(52) U.S. Cl.
CPC *G09F 9/30* (2013.01); *B65G 15/00* (2013.01); *G09F 19/22* (2013.01); *G09G 5/006* (2013.01); *G09F 11/12* (2013.01); *G09F 11/26* (2013.01); *G09F 19/02* (2013.01); *G09F 21/00* (2013.01); *G09G 2300/026* (2013.01); *G09G 2360/04* (2013.01)
USPC .............................. 345/1.3; 345/178

(58) Field of Classification Search
USPC ............................ 345/1.3, 31, 108–111, 211
See application file for complete search history.

(56) References Cited

U.S. PATENT DOCUMENTS 4,160,973 A 7/1979 Berlin, Jr.
5,165,526 A 11/1992 Conklin, Jr.
(Continued)

FOREIGN PATENT DOCUMENTS

GB 2 420 214 A 5/2006

OTHER PUBLICATIONS

Lohmeyer, Mark S., "Digital Image Warping: Theory and Real Time Hardware Implementation Issues", Massachusetts Institute of Technology, 1996, p. 1-94.

(Continued)

Primary Examiner — Michael Faragalla
(74) Attorney, Agent, or Firm — Westerman, Hattori, Daniels & Adrian, LLP

(57) ABSTRACT

A mobile image display system includes multiple movable panels, each including a video display. Using a position sensor, the system knows when a particular panel reaches a position in which the displayed image is distorted due to overlapping or misalignment of the panels. Then, a central processing unit provides the panels in the region where distortion is present with a modified image to correct for this distortion. Additionally, the panels may include light and/or weight sensors. In response to these sensors, an image in any location the carousel can be revised in response to the presence of an article such as a suitcase.

23 Claims, 12 Drawing Sheets

(56) References Cited

U.S. PATENT DOCUMENTS

| | | | |
|---|---|---|---|
| 5,280,831 A | 1/1994 | Conklin, Jr. | |
| 5,330,044 A | 7/1994 | Conklin, Jr. | |
| 5,427,227 A | 6/1995 | Crandall et al. | |
| 5,717,416 A | 2/1998 | Chakrabarti | |
| 6,044,961 A | 4/2000 | Hine | |
| 6,186,314 B1 | 2/2001 | Conklin, Jr. | |
| 6,698,577 B1 | 3/2004 | Conklin, Jr. et al. | |
| 6,908,653 B2 | 6/2005 | Keane | |
| 6,910,293 B1 | 6/2005 | Armstrong et al. | |
| 7,053,867 B2 * | 5/2006 | Hine et al. | 345/31 |
| 2004/0075618 A1 | 4/2004 | Kohan et al. | |
| 2007/0267272 A1 * | 11/2007 | Grant et al. | 198/502.1 |
| 2008/0100806 A1 | 5/2008 | Inazumi | |
| 2008/0110729 A1 | 5/2008 | Grant et al. | |

OTHER PUBLICATIONS

International Search Report and PCT/ISA/220 of PCT/CA2011/000053, mailing date of Mar. 29, 2011.

Written Opinion of PCT/CA2011/000053, maling date of Mar. 29, 2011.

Extended European Search Report dated Sep. 1, 2014, issued in corresponding European Patent Application No. 14161438.8 (7 pages).

* cited by examiner

MOBILE IMAGE DISPLAY SYSTEM

TECHNICAL FIELD

A mobile image display system is disclosed. In the mobile image display system, video displays are mounted on panels which move in a circuit on a carousel.

BACKGROUND OF THE INVENTION

Baggage carousels are a common sight in modern airports. In the typical baggage carousel, suitcases or other articles are caused to arrive on the carousel by a conveyor belt or a chute. Then, the suitcases or other articles move along the closed circuit of the carousel until their owner retrieves the suitcase or article. Often, the owner of the article must wait for a significant amount of time until their suitcase or other article arrives on the carousel. Since this is a "captive audience," baggage carousel space is of interest to advertisers. It has been known to place advertisements on baggage carousels using decals or stickers on the panels. It has also been known to place advertisements on baggage carousels using video display panels. However, the functionality and usefulness of such conventional forms of baggage carousel advertising is limited.

SUMMARY OF THE INVENTION

A first aspect of the mobile image display system comprises a carousel frame, a plurality of panels movable on the carousel frame, at least one of the plurality of panels including a video display, at least one position sensor disposed on the carousel frame at trigger points for image display modification, a central processing unit, a power supply providing power to at least one of the plurality of panels, and a data transmission device which communicates data between the central processing unit and at least one of the plurality of panels. The central processing unit sends image data to the plurality of panels via the data transmission device. Furthermore, when the at least one position sensor detects that one of the plurality of panels is at a trigger point for the image display modification, the at least one position sensor transmits location data of the one of the plurality of panels to the central processing unit, and the central processing unit generates a modified image which is transmitted from the central processing unit to the one of the plurality of panels via the data transmission device.

In a second aspect of the mobile image display system, the plurality of panels each include at least one light sensor or weight sensor. Furthermore, when the at least one light sensor or weight sensor detects an object obstructing the image data on one of the plurality of panels, the at least one light sensor or weight sensor transmits image obstruction data of the one of the plurality of panels to the central processing unit, and the central processing unit generates a revised image which is transmitted from the central processing unit to the one of the plurality of panels via the data transmission device.

In a third aspect of the mobile image display system, the revised image includes a resized image, a relocated image and image data animation.

In a fourth aspect of the mobile image display system, the power supply device comprises a power rail disposed along at least one of a position of the carousel frame corresponding to an upper edge of the plurality of panels and a position of the carousel frame corresponding to a lower edge of the plurality of panels.

In a fifth aspect of the mobile image display system, each of the plurality of panels further comprises an electrical pick-up which corresponds to the power rail.

In a sixth aspect of the mobile image display system, the plurality of panels is divided into a plurality of groups of panels. A first panel in one of the plurality of groups of panels further comprises an electrical pick-up which corresponds to the power rail. The other panels in the one of the plurality of groups of panels are connected to the first panels in the one of the plurality of groups of panels via a wired connection.

A seventh aspect of the mobile image display system further comprises a data transmission rail disposed along at least one of a position of the carousel frame corresponding to an upper edge of the plurality of panels and a position of the carousel frame corresponding to a lower edge of the plurality of panels.

In an eighth aspect of the mobile image display system, each of the plurality of panels further comprises an electrical pick-up which corresponds to the data transmission rail.

In a ninth aspect of the mobile image display system, the plurality of panels is divided into a plurality of groups of panels. A first panel in one of the plurality of groups of panels further comprises an electrical pick-up which corresponds to the data transmission rail. The other panels in the one of the plurality of groups of panels are connected to the first panels in the one of the plurality of groups of panels via a wired connection.

A tenth aspect of the mobile image display system further comprises a wireless data transfer device which wirelessly transfers data between the central processing unit and each of the plurality of panels.

In an eleventh aspect of the mobile image display system, the image display modification is correction of distorted images which occur due to overlapping or misalignment of the plurality of panels in a corner of the mobile image display system.

In a twelfth aspect of the mobile image display system, the mobile image display system is a sloped-panel baggage carousel.

In a thirteenth aspect of the mobile image display system, the mobile image display system is a flat-panel baggage carousel.

In a fourteenth aspect of the mobile image display system, the video display is an organic light emitting diode (OLED) or light emitting diode (LED) display.

In a fifteenth aspect of the mobile image display system, the video display is a liquid crystal display (LCD) or a plasma display.

A method is also disclosed. The method is a method for displaying images on panels which are movable on a mobile image display system, the panels each including a video display, the first aspect of the method comprising displaying an image on the plurality of panels, detecting when one of the plurality of panels is at a trigger point for image display modification using a position sensor, transmitting location data about the one panel to a central processing unit via a data transmission device, generating a modified image using the central processing unit, transmitting the modified image from the central processing unit to the one panel via the data transmission device, and displaying the modified image on the one panel.

A second aspect of the method further comprises detecting an object obstructing the image or the corrected image on the one panel using at least one light sensor or weight sensor, transmitting image obstruction data corresponding to the panel to the central processing unit, generating a revised image using the central processing unit, transmitting the revised image from the central processing unit to the one panel via the data transmission device, and displaying the revised image on the one panel.

In a third aspect of the method, the revised image includes a resized image, a relocated image and image data animation.

In a fourth aspect of the method, the image display modification is correction of distorted images which occur due to overlapping or misalignment of the plurality of panels in a corner of the mobile image display system.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
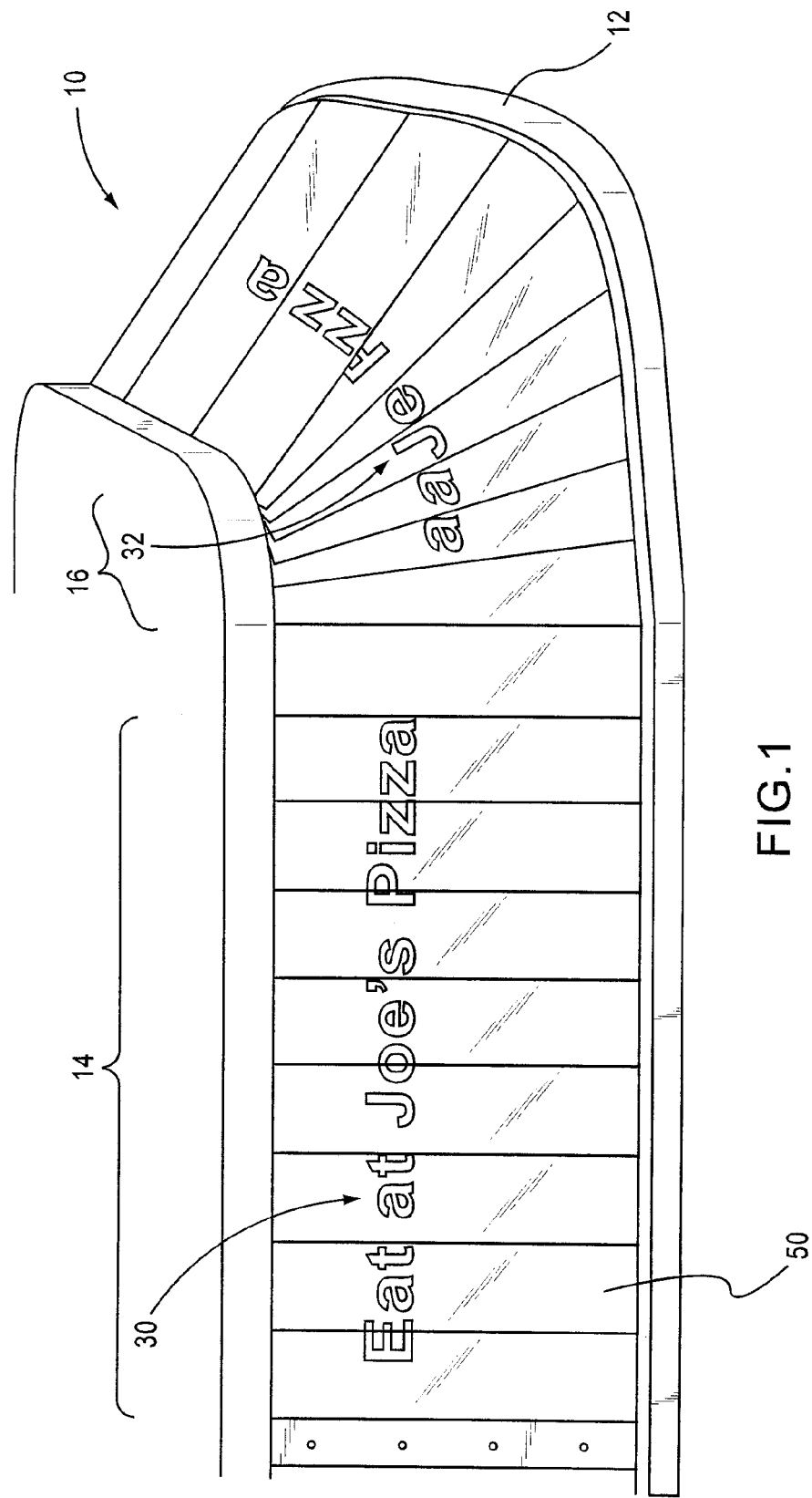
FIG. 1 is a perspective view of a conventional baggage carousel.

The mobile image display system will now be described in greater detail. FIG. 1 shows an overview of one embodiment of the conventional mobile image display system. As illustrated, the carousel 10 includes a frame 12. Panels 50 are fitted into the frame 12 and move in a clockwise or counter-clockwise direction utilizing a conventional driving mechanism (not shown). Accordingly, when an article is placed on the panels 50, the article will move along the circuit of the carousel 10 so that a person may retrieve the article from the carousel 10. In FIG. 1, the panels 50 each include a video or non-video (such as a decal or sticker) graphical display, which allows for an advertisement or other message to be displayed to persons waiting to retrieve articles from the carousel 10 by displaying an image on one or more of the panels 50. An example of this is normal image 30 in straight region 14, which may be an advertisement such as "Eat at Joe's Pizza." However, when the panels 50 which display an image reach, for example, a corner region 16 of the carousel 12, the message becomes distorted due to overlapping of the panels. For example, the "Eat at Joe's Pizza" image becomes a distorted unmodified image 32 which appears instead as "a a Je Pzza". Thus, a viewer cannot understand the advertising message when the panels are in the corner region.

Figure 2:
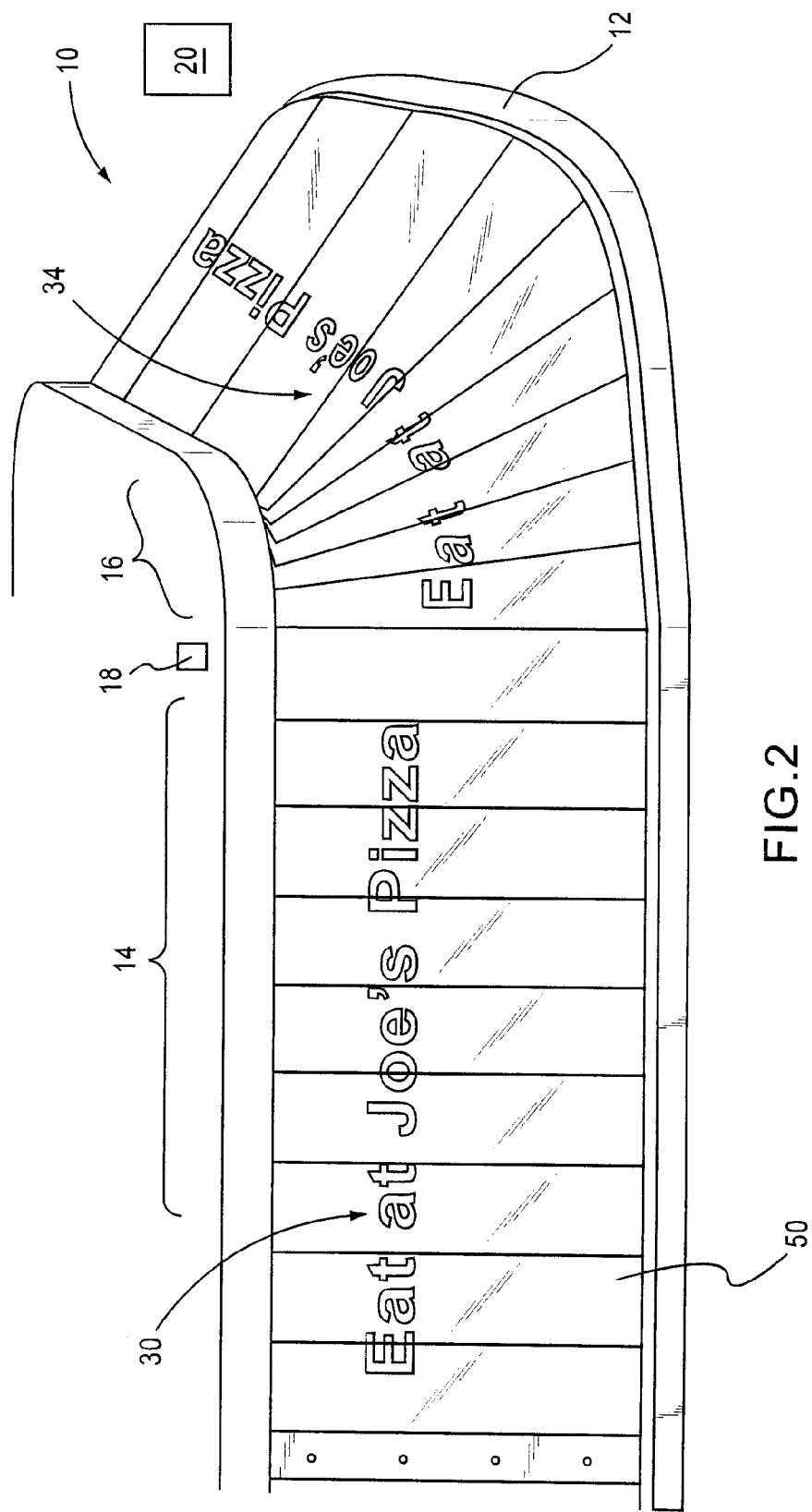
FIG. 2 is a perspective view of a first embodiment of a baggage carousel.

The mobile image display system disclosed herein avoids this distortion, as shown in FIG. 2. In FIG. 2, each of the panels 50 includes a video display, which may be either a single video screen or a composite of multiple video screens. However, not all of the panels need to include a video display. One or two or more panels can include the video display and still be within the scope of the invention. When the panels 50 which display an image reach, for example, a corner region 16 of the carousel 12, the message is not distorted. Rather, the panels 50 in the corner region 16 display a modified image 34. Therefore, even in the corner region 16, the "Eat at Joe's Pizza" image can still be read by persons waiting to retrieve an article from the carousel 12. This will be discussed in greater detail below. Also, rather than removing a distortion in the corner region 16 of the carousel, the system can create an intentional creative modification. This will also be discussed in greater detail below. Additionally, it is noted that the embodiments herein can be applied to a variety of systems, including carousels which do not have a corner portion, per se. For example, the embodiments herein can be applied to carousels which only have curved portion, but no true "corner" portion.

Figure 3:
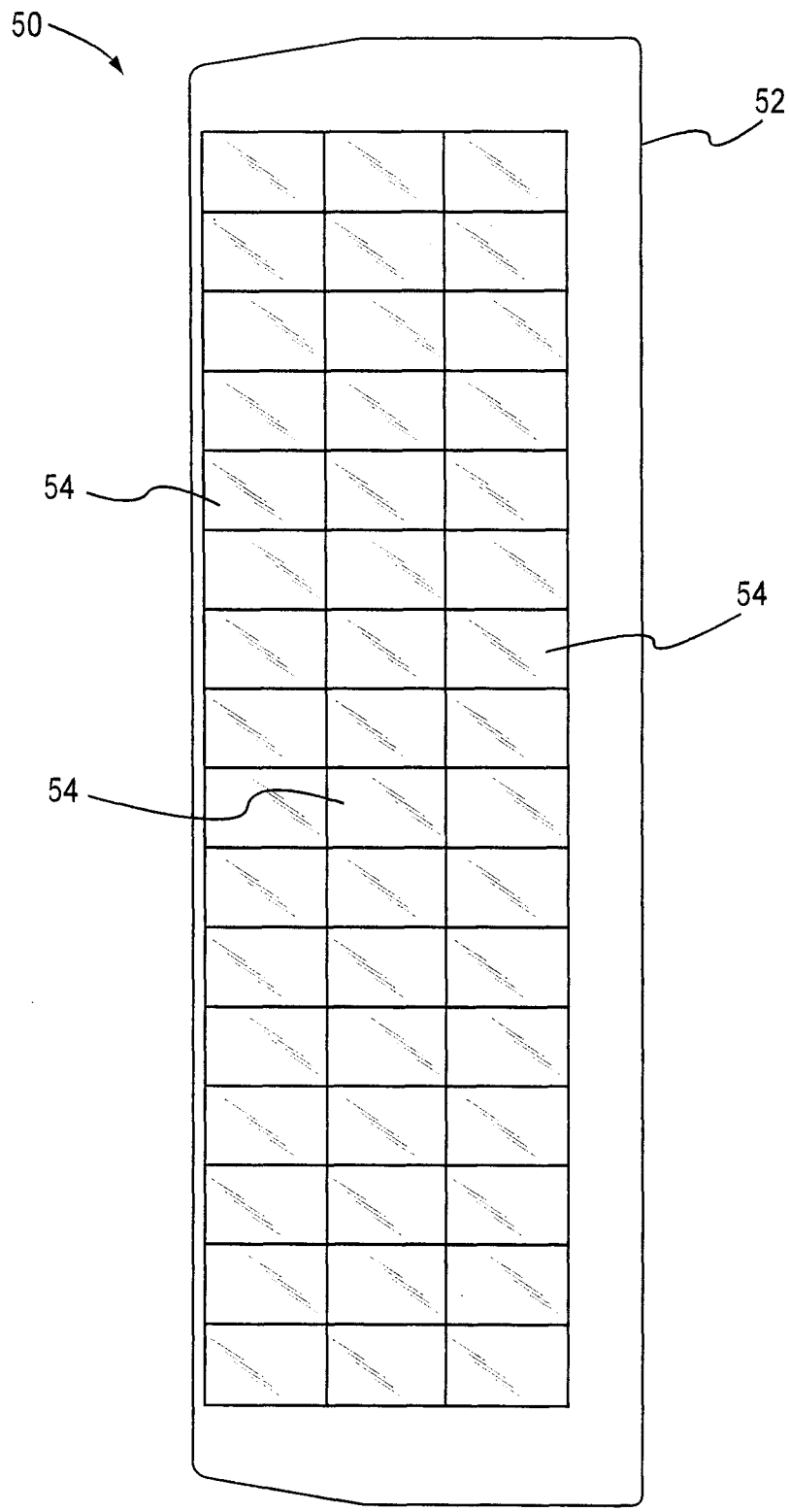
FIG. 3 is a front view of a panel of the first embodiment of the baggage carousel.
Figure 4:
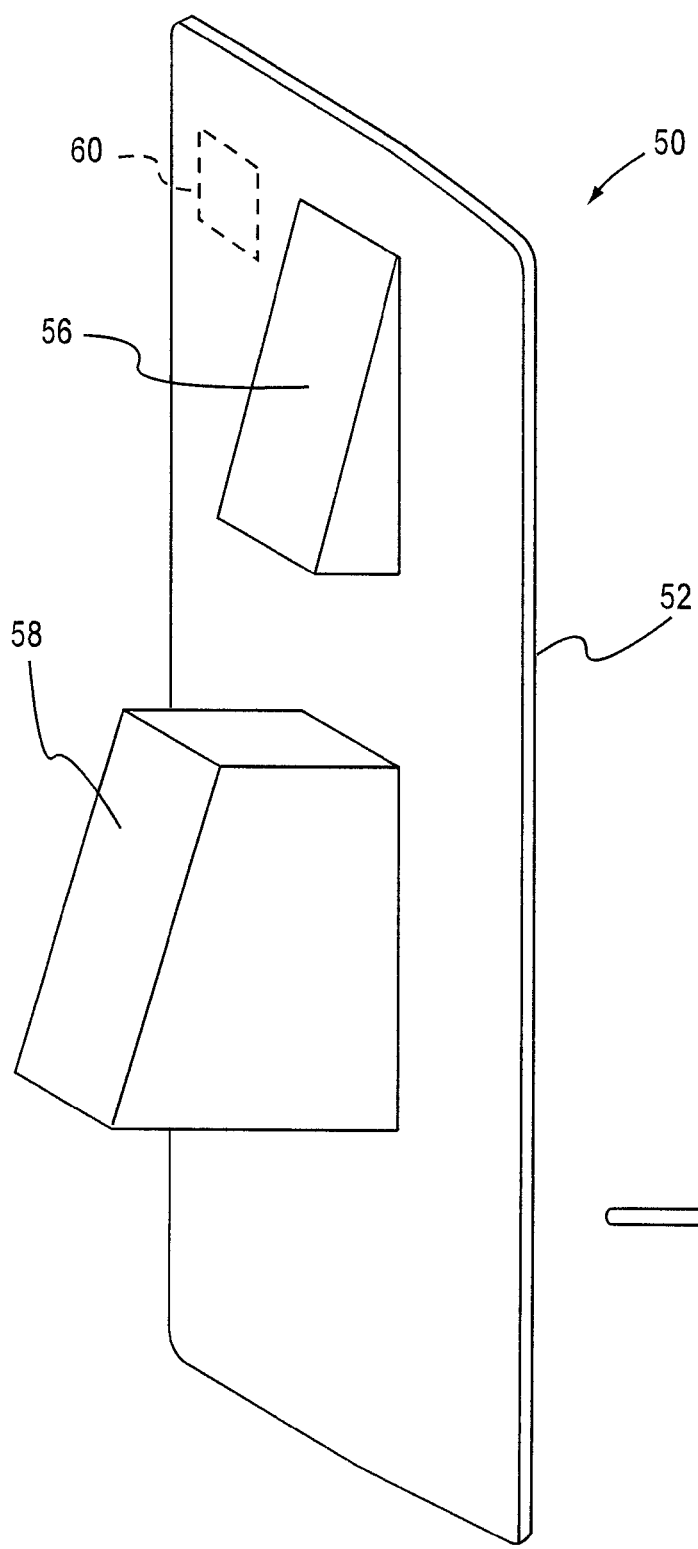
FIG. 4 is a perspective view of a rear side of the panel of the first embodiment of the baggage carousel.
Figure 5:
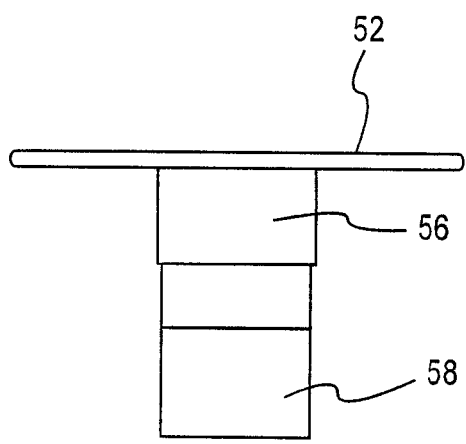
FIG. 5 is a side view of the panel of the first embodiment of the baggage carousel.

An embodiment of a panel 50 is illustrated in FIGS. 3-5. The panel 50 includes a panel main body 52. On the front side of the panel main body 52, a plurality of individual display screens 54 may be installed. These individual display screens 54 may be screens of any technology, such as plasma screens, liquid crystal display (LCD) screens, or organic light emitting diode (OLED) screens. Alternatively, the panel main body 52 may include a single display screen. As shown in FIGS. 4 and 5, the back side of panel main body 52 may include electrical component boxes 56 and 58. These electrical component boxes 56 and 58 may include components such as wireless communication modules, power management modules, memory modules, graphical processing units and data processing units. The exact configuration of the electrical component boxes 56 and 58 is not particularly limited, as long as they are positioned such that they do not physically obstruct or interfere with the internal mechanical elements of the carousel 12, such as the elements used to move the panels 50 (not shown). For example, the electrical component boxes 56 and 58 can be attached to the conventional driving mechanism which moves the panels (not shown).

Additionally, each of the panels 50 having a video display includes an identifier chip 60, which may be included, for example, within one of the electrical component boxes 56 and 58, embedded within the panel 50 itself, or may be positioned directly on the back surface of panel main body 52. The location of the identifier chip 60 is not particularly limited, as long as it can be read by a position sensor 18 (discussed below). The identifier chip 60 for each panel 50 includes a unique identifier code corresponding to that particular panel 50. Furthermore, a position sensor 18 is installed at one or more locations on the carousel 12, for example, at a location corresponding to the beginning of a corner region 16. The location of the position sensors 18 is not particularly limited as long as it can read the identifier chips 60 of the panels 50. A position sensor 18 may also be provided at the end of the corner region 16. The position sensor 18 communicates with the panels 50 passing the position of the position sensor 18. Therefore, the position sensor 18 may report the position of all of the panels 50 to a central processing unit (CPU) 20. The communication between the position sensor 18 and the identifier chip 60 may be any appropriate communication such as radio frequency identification (RFID). The communication between the position sensors 18 and the CPU 20 may be any appropriate communication such as a wired or wireless local area network. Additionally, the CPU 20 may be located at any position which is convenient, such as at a position within the frame 12 of the carousel 10 or outside of the carousel 10 entirely.

When it is reported to the CPU 20 that one or more panels 50 is in a corner region 16, the CPU 20 processes the distorted unmodified image 32 so that it may appear like the normal image 30. This action may alternatively be called distortion correction, unpuzzling, or image warping correction. The computational processes implemented by the CPU 20 may include those discussed in "Digital Image Warping: Theory and Real Time Hardware Implementation Issues" thesis by Mark Sebastian Lohmeyer, Massachusetts Institute of Technology, the entire contents of which are incorporated herein. This CPU 20 then transmits the modified image 34 to the panel 50 which is known to be in the corner region 16. This communication may be by any appropriate communication such as a wired or wireless local area network. Additionally, the modified image 34 does not necessarily have to resemble the normal image 30. Instead, the modified image 34 could be a graphical display which uniquely appears in the corner regions 16. The term "modified image" refers to images which appear based on the location of the panel 50 along the path of the carousel 10.

Figure 8:
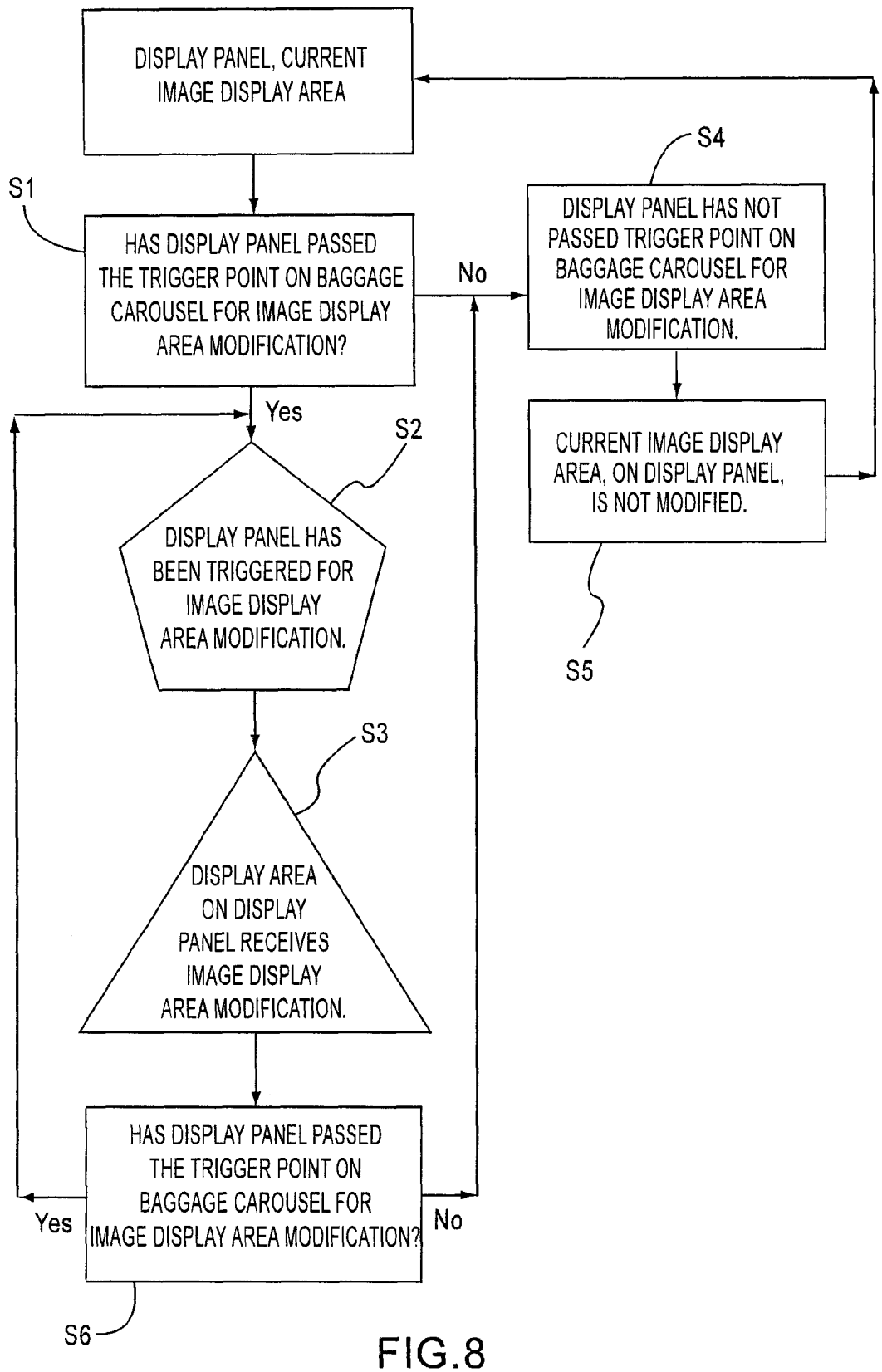
FIG. 8 is a flow chart illustrating the image modification operation of the baggage carousel.

The process of generating a modified image 34 is illustrated in FIG. 8. As illustrated in step S1, it is determined if the panel has passed a trigger point on the baggage carousel for image display area modification. If yes, the process continues to steps S2 and S3 where the display panel is triggered for image display area modification and where the display area on the display panel receives image display area modification. If the answer in step S1 is no, then the process continues to steps S4 and S5 where the panel has not passed a trigger point for image display area modification, and the current image display area on the display panel is not modified. Additionally, in step S6, it is again determined whether or not the panel has passed a trigger point on the baggage carousel for image display area modification. If yes, the process returns to step S2 where the image remains modified. If no, the process moves to step S4 where the image is not modified. The trigger point may be, for example, the beginning of the corner portion 16. Additionally, the trigger point may be a position at the beginning of a curve of the carousel, or even a designated trigger point on a straight portion where an intentional creative modification of the image is implemented.

As an alternative embodiment, the panels 50 can be divided into a plurality of groups of panels. These groups of panels may be electrically connected to each other. The first panel 50 in each group, in the movement direction, is regarded as a leader panel. In this embodiment, only the leader panel may communicate with the CPU 20. The leader panel can then communicate with the follower panels. This minimizes delay due to communication with the CPU 20. Each of the panels in a group may have an identifier chip 60, or only the leader panel may have an identifier chip 60. In this embodiment, the position sensor 18 detects the position of at least the leader panel, then transmits this information to the CPU 20. The CPU 20 then computes a modified image and provides the modified image data to the leader panel of a group of panels via wired or wireless communication. The leader panel then shares this information with the follower panels within the same group.

Figure 6:
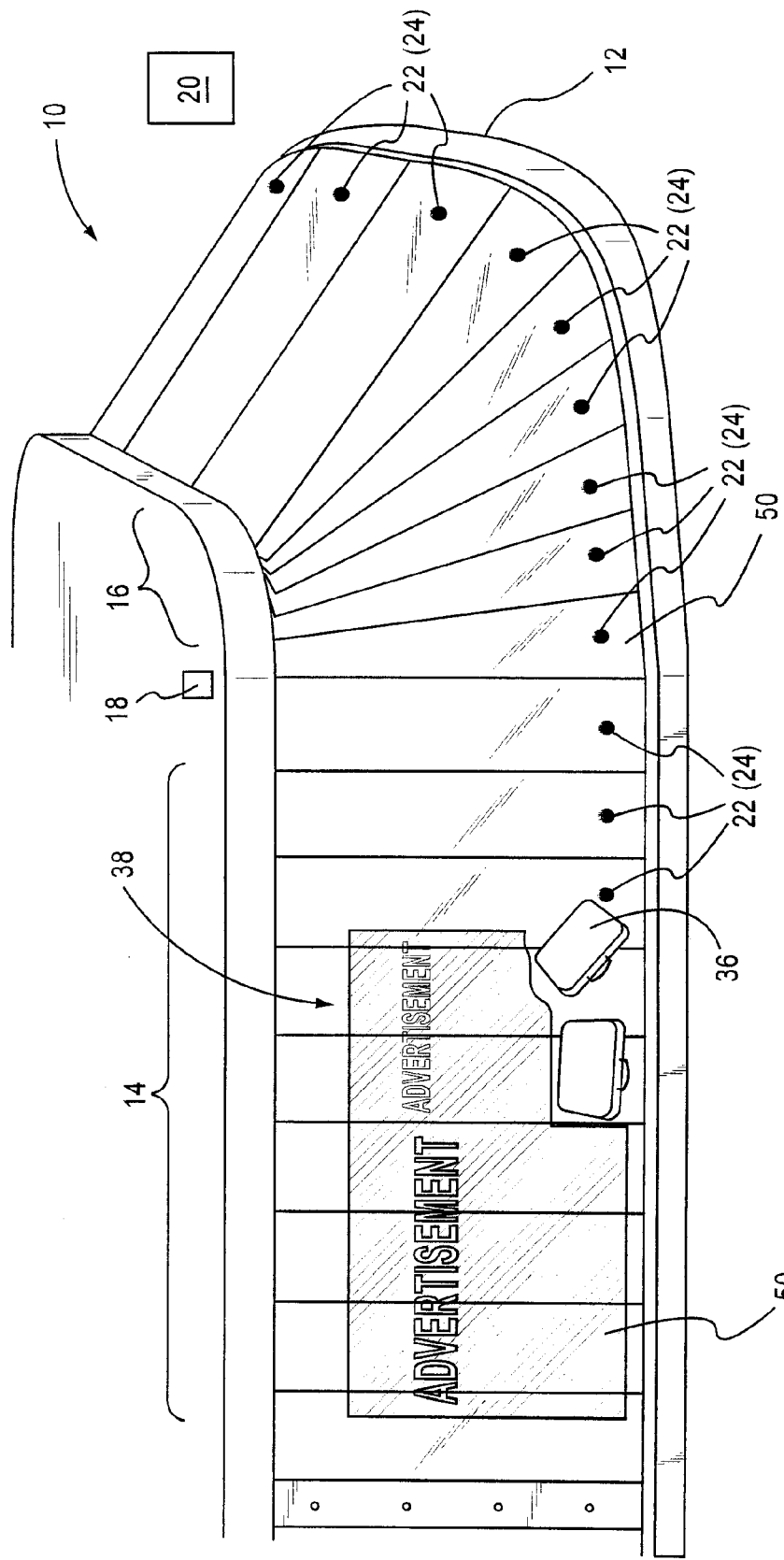
FIG. 6 is a perspective view of a second embodiment of the baggage carousel.
Figure 7:
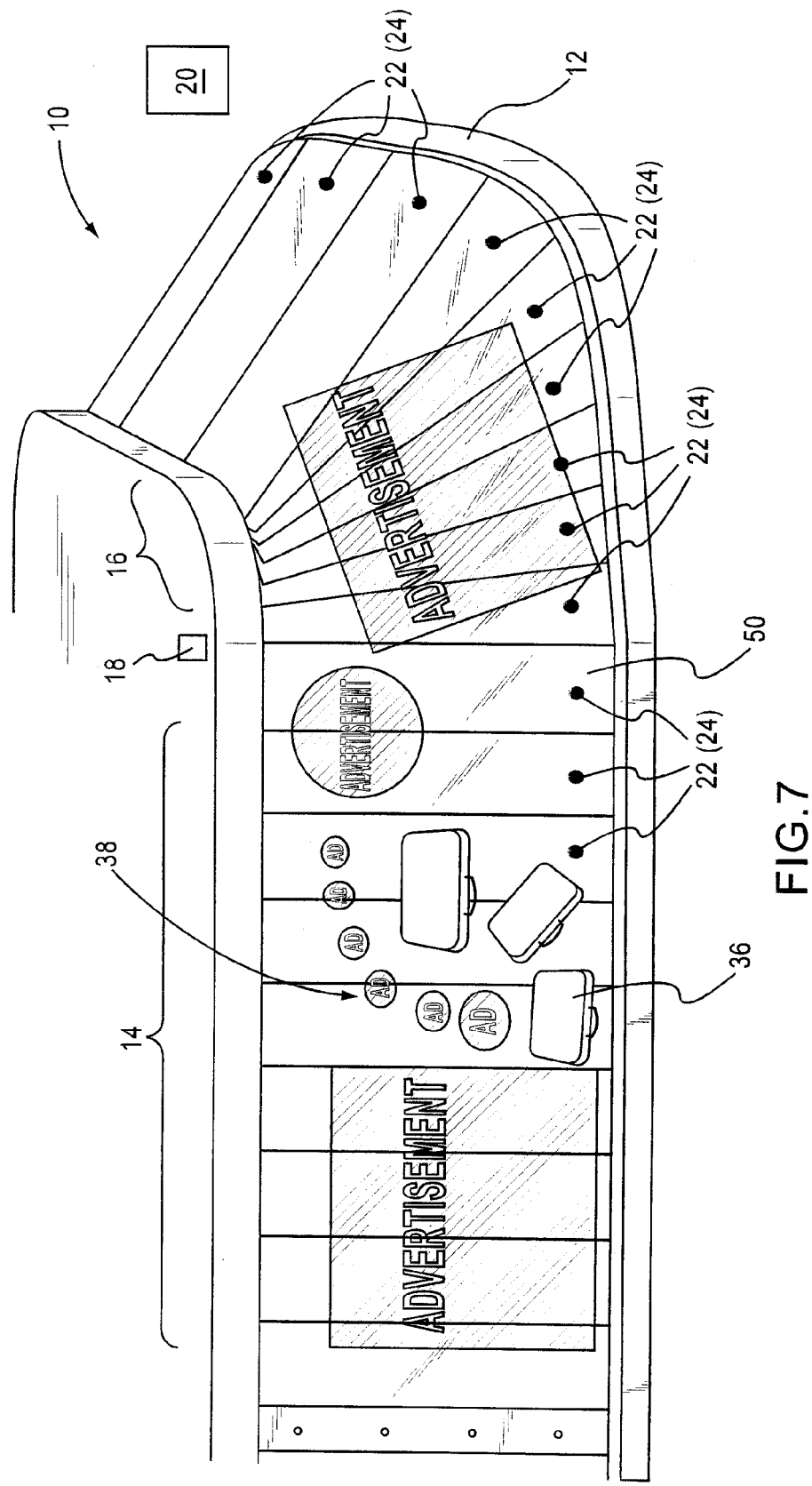
FIG. 7 is another perspective view of the second embodiment of the baggage carousel.

In yet another embodiment of the system, one or more of the panels 50 may additionally include one or more light sensors 22 and/or one or more weight sensors 24, as illustrated in FIG. 6. These sensors are disposed on the front side of the panel main body 18. While it is preferable to position the light and weight sensors near the lower edge of the panels 50, the sensors can be provided anywhere on the panels 50. The light sensors 22 and/or weight sensors 24 can be used to determine if an article 36 is temporary positioned on a panel 50 which is displaying all or part of an image, thus obscuring the image. When this occurs, the sensors communicate this information to the CPU 20, which will then produce a revised image 38. This can be done in either the straight region 14 or the corner region 16. For example, as shown in FIG. 6, the revised image 38 is a resizing of the "Advertisement" around the article 36. Alternatively, as shown in FIG. 7, the revised image 38 is an animation or relocation of the advertisement. As another possible embodiment, the image may be interactive and may appear to "react" to the article. For example, if the image is an advertisement for a beach resort, when an article 36 is placed on the carousel 12, a water-splash animation can be displayed such that it appears that the carousel 12 is reacting to the article 36. The term "revised image" refers to images which appear in response to an article present on the panel (as detected by sensors), rather than the location of the panel in the carousel.

Figure 9:
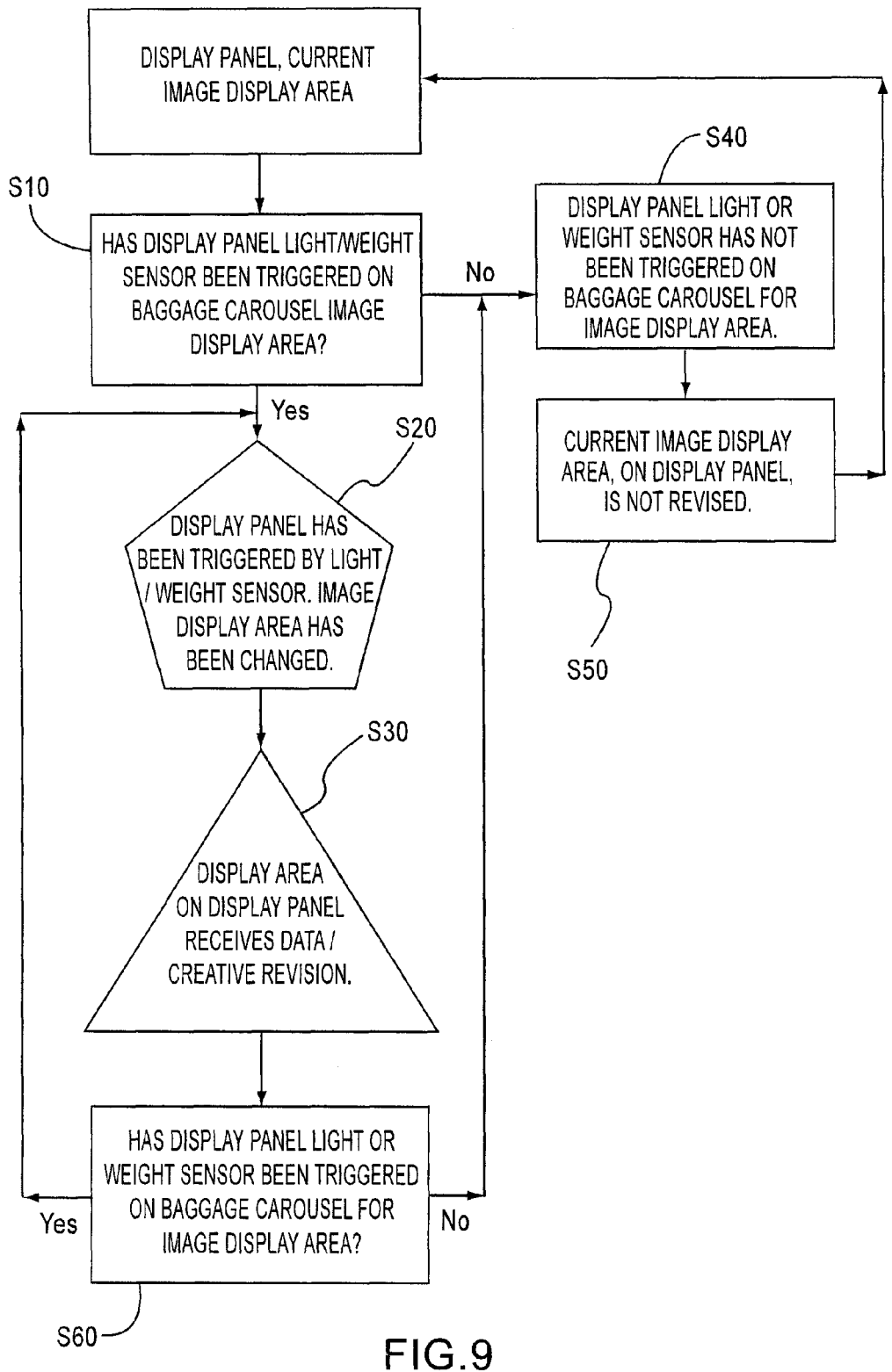
FIG. 9 is a flow chart illustrating the image revision operation of the baggage carousel.

The process of generating a revised image 38 is illustrated in FIG. 9. As illustrated in step S10, it is determined if a light and/or weight sensor on the panel has been triggered by an article. If yes, the process continues to steps S20 and S30 where the display panel is triggered for image revision and where the display area on the display panel receives a revised image. If the answer in step S10 is no, then the process continues to steps S40 and S50 where a light and/or weight sensor in the panel has not been triggered by an article, and the current image on the display panel is not revised. Additionally, in step S60, if it is determined that a light and/or weight sensor on the panel has been triggered by an article. If yes, the process returns to step S20 where the image remains revised. If no, the process moves to step S40 where the image is not revised. Thus, when an article is removed, the image can return to its unrevised state.

Next, power distribution to the panels 50 will be discussed. Power may be distributed to the panels 50 in a variety of ways. For example, magnetic induction can be used. As another example, a wired "umbilical cord" configuration can be used where each of the panels 50 is tethered to the carousel 12 via a power cable which is free to move along with the panel 50. As yet another example, a wired "umbilical cord" configuration can be used where a "leader" of a group of panels is tethered to the carousel 12 via a power cable which is free to move along with the leader panel. The leader panel is wired to the follower panels, and shares power via such wiring.

Figure 10:
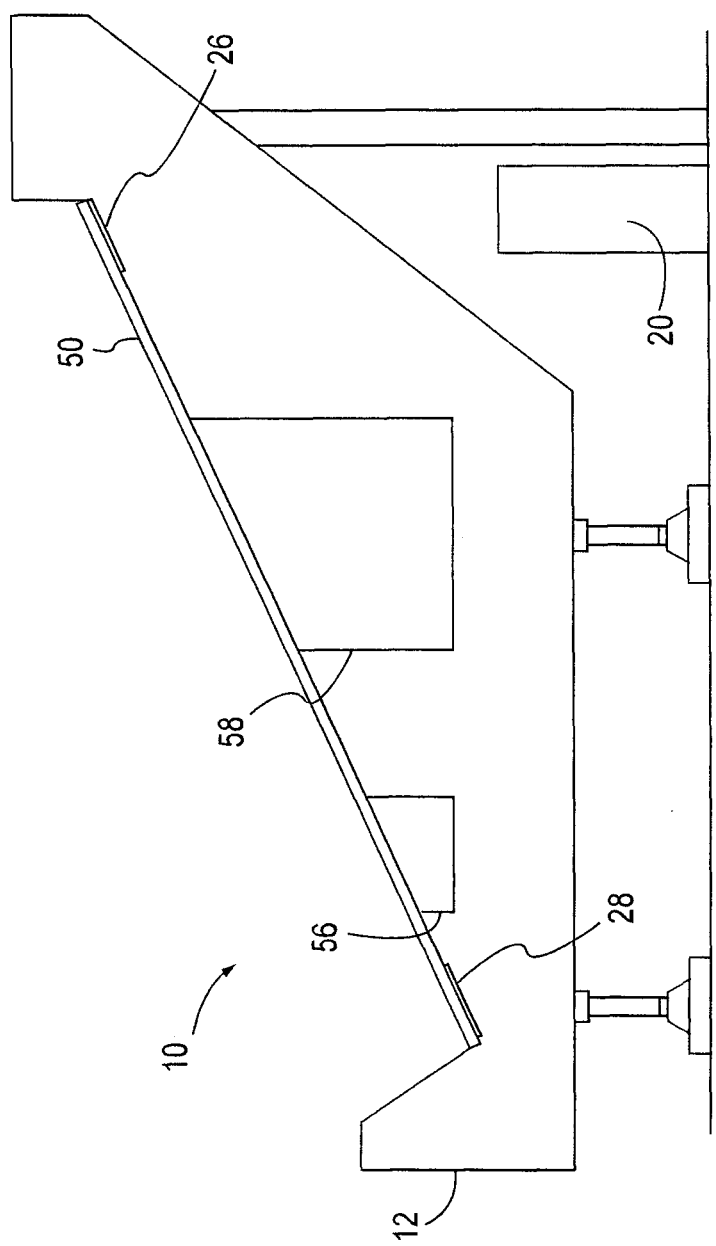
FIG. 10 is a cross-sectional view of the baggage carousel.
Figure 11:
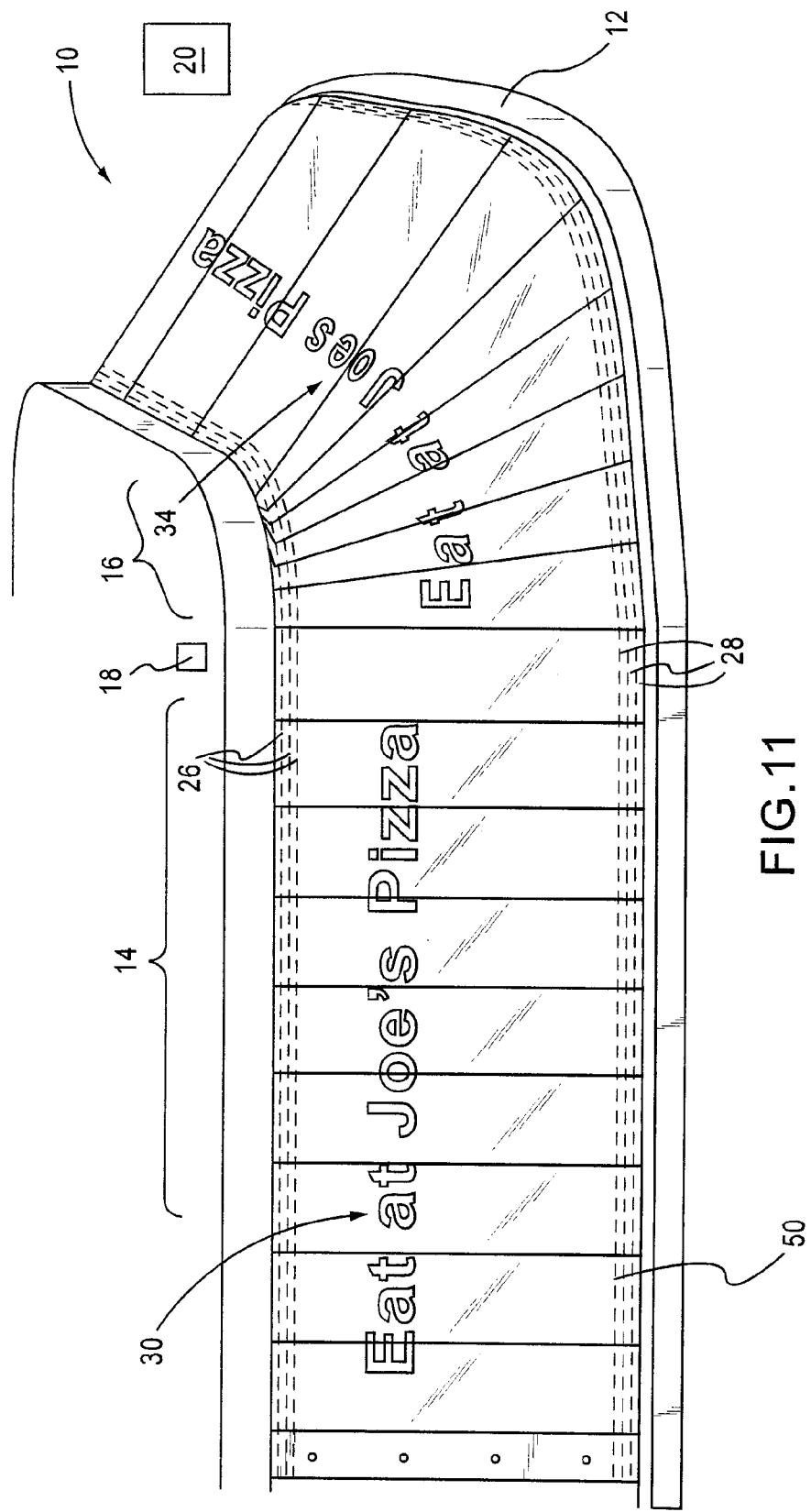
FIG. 11 is a perspective view showing the location of power rails.
Figure 12:
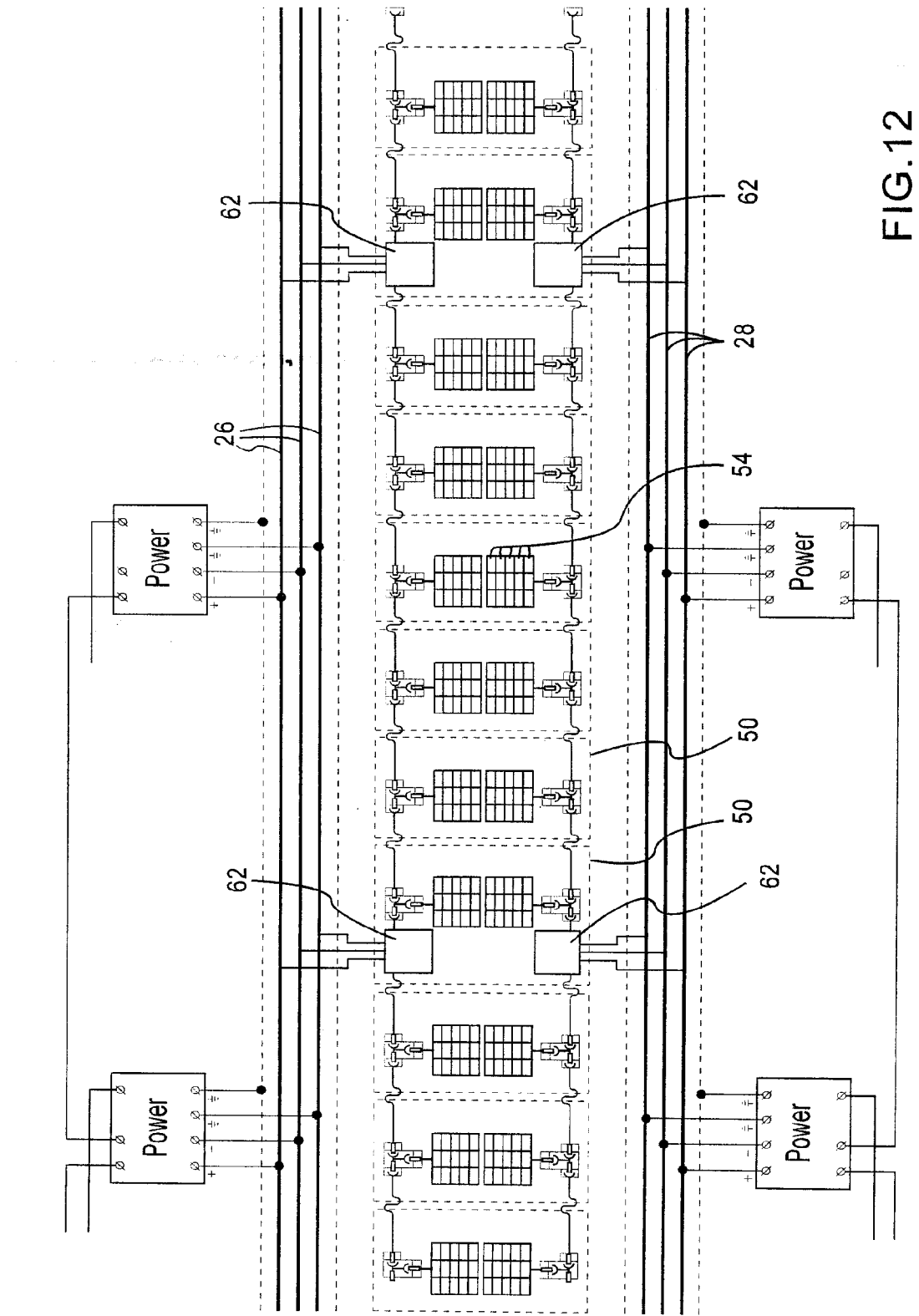
FIG. 12 is a schematic view showing the location of the power rails.

Another example of power distribution involves at least one of an upper power rail 26 and a lower power rail 28. This is illustrated in FIGS. 10 and 11. Each panel 50 can include power pickup module(s) 62, which run along the power rails 26 and 28, thus providing power to the panel 50. Furthermore, FIG. 10 also illustrates another possible location of CPU 20. As another variation, only a "leader" of a group of panels has power pickup module(s) 62, and is wired to follower panels, and shares power via such wiring. This embodiment is illustrated in FIG. 12.

Additionally, data may be transmitted in a similar manner as power. As noted above, wireless communication can be used for data transfer. However, alternatively, wired communication can be used. Like power distribution, the data transmission can use an "umbilical cord" configuration or a data pickup traveling along a data communication rail. Each panel 50 may communicate in this manner, or only a "leader" of a group of panels may communication in this manner and share the data with the followers within the group.

Figure 13:
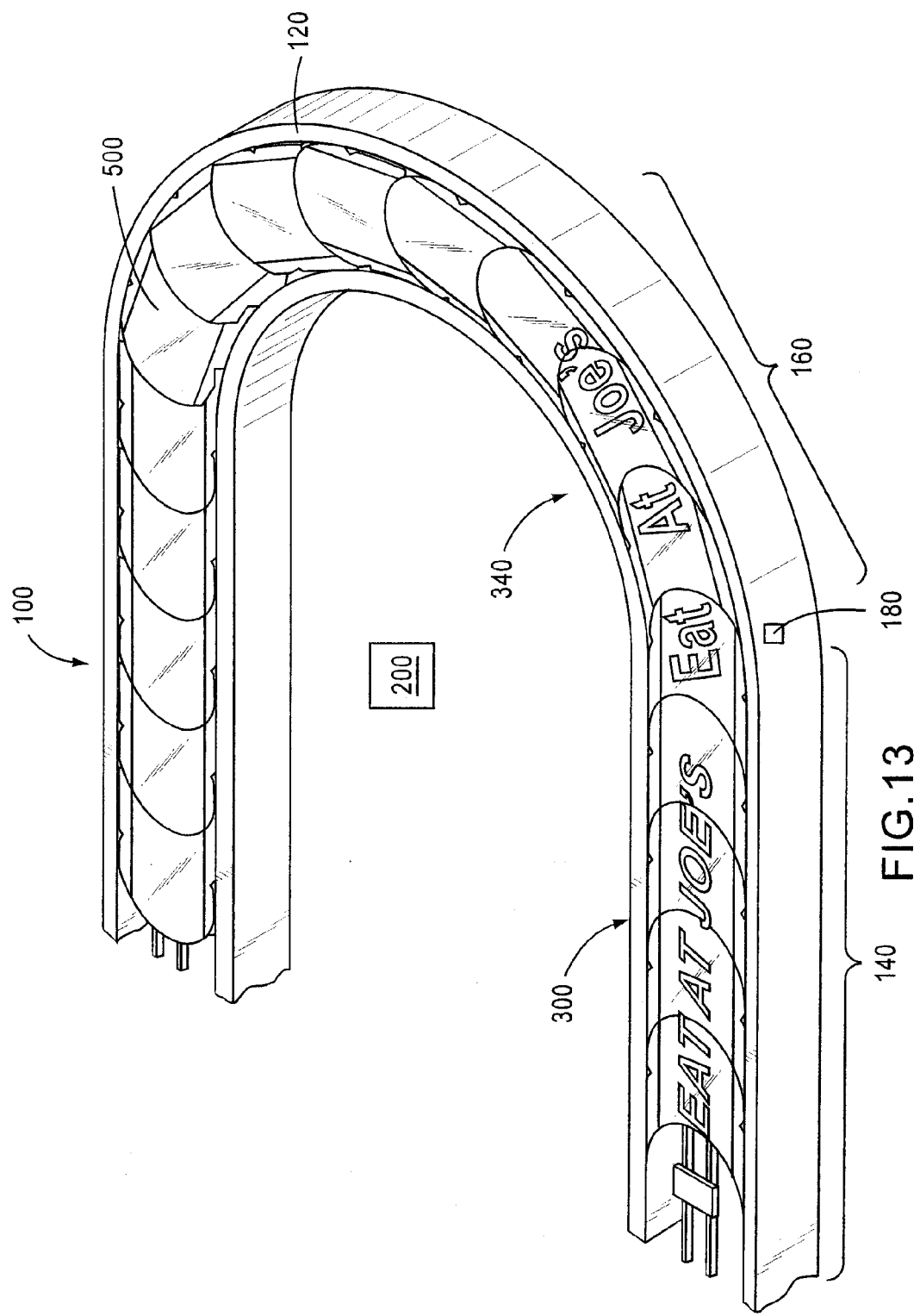
FIG. 13 is a perspective view showing a flat embodiment of the baggage carousel.

Furthermore, the mobile image display system can also be applied to a flat baggage carousel system. This is illustrated in FIG. 13. Similar to the embodiment described above, in this embodiment includes a flat carousel 100 including a frame 120 and multiple panels 500. The panels 500 each include video display screens, and move through the straight section 140 and the corner section 160. Each panel 500 includes an identifier chip (not illustrated), which communicates with a position sensor 180 at the beginning of the corner section 160. The position sensor 18 communicates with the CPU 200, which provides a modified image 340 so that the image in the corner section 160 may appear like normal image 300, for example. In this embodiment, the distortion is caused by misalignment of the panels 500, rather than overlapping of the panels 500. Like the embodiment described above, this embodiment may also include light and weight sensors, and can revise an image based on whether an article is temporarily disposed on the carousel.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

I claim:

1. A mobile image display system, comprising:
   a carousel frame;
   a plurality of panels movable on said carousel frame, at least one of said plurality of panels including a video display;
   at least one position sensor disposed on said carousel frame at trigger points for image display modification;
   a central processing unit;
   a power supply providing power to at least one of said plurality of panels; and
   a data transmission device which communicates data between said central processing unit and at least one of said plurality of panels for sending image data thereto,
   wherein when said at least one position sensor detects that one of said plurality of panels is at a trigger point for said image display modification, said at least one position sensor transmits location data of said one of said plurality of panels to said central processing unit, and said central processing unit generates a modified image which is transmitted from said central processing unit to said one of said plurality of panels via said data transmission device.

2. The mobile image display system of claim 1,
   wherein said plurality of panels each include at least one light sensor or weight sensor, and
   wherein when said at least one light sensor or weight sensor detects an object obstructing said image data on one of said plurality of panels, said at least one light sensor or weight sensor transmits image obstruction data of said one of said plurality of panels to said central processing unit, and said central processing unit generates a revised image which is transmitted from said central processing unit to said one of said plurality of panels via said data transmission device.

3. The mobile image display system of claim 2, wherein said revised image includes at least one of a resized image, a relocated image and image data animation.

4. The mobile image display system of claim 1, wherein said power supply device comprises a power rail disposed along at least one of a position of said carousel frame corresponding to an upper edge of said plurality of panels and a position of said carousel frame corresponding to a lower edge of said plurality of panels.

5. The mobile image display system of claim 4, wherein each of said plurality of panels further comprises an electrical pick-up which corresponds to said power rail.

6. The mobile image display system of claim 4, wherein said plurality of panels are divided into a plurality of groups of panels,
   wherein a first panel in one of said plurality of groups of panels further comprises an electrical pick-up which corresponds to said power rail, and
   wherein other panels in said one of said plurality of groups of panels are connected to said first panels in said one of said plurality of groups of panels via a wired connection.

7. The mobile image display system of claim 1, further comprising a data transmission rail disposed along at least one of a position of said carousel frame corresponding to an upper edge of said plurality of panels and a position of said carousel frame corresponding to a lower edge of said plurality of panels.

8. The mobile image display system of claim 7, wherein each of said plurality of panels further comprises an electrical pick-up which corresponds to said data transmission rail.

9. The mobile image display system of claim 7, wherein said plurality of panels are divided into a plurality of groups of panels,
   wherein a first panel in one of said plurality of groups of panels further comprises an electrical pick-up which corresponds to said data transmission rail, and
   wherein other panels in said one of said plurality of groups of panels are connected to said first panels in said one of said plurality of groups of panels via a wired connection.

10. The mobile image display system of claim 1, further comprising a wireless data transfer device which wirelessly transfers data between said central processing unit and each of said plurality of panels.

11. The mobile image display system of claim 1, wherein said image display modification is correction of distorted images which occur due to overlapping or misalignment of said plurality of panels in a corner of said mobile image display system.

12. The mobile image display system of claim 1, wherein said mobile image display system is a sloped-panel baggage carousel.

13. The mobile image display system of claim 1, wherein said mobile image display system is a flat-panel baggage carousel.

14. The mobile image display system of claim 1, wherein said video display is an organic light emitting diode (OLED) or light emitting diode (LED) display.

15. The mobile image display system of claim 1, wherein said video display is a liquid crystal display (LCD) or a plasma display.

16. A method for displaying images on panels which are movable on a mobile image display system, the panels each including a video display, comprising:
   displaying an image on said plurality of panels,
   detecting when one of said plurality of panels is at a trigger point for image display modification using a position sensor,
   transmitting location data about said one panel to a central processing unit via a data transmission device,
   generating a modified image using said central processing unit, transmitting said modified image from said central processing unit to said one panel via said data transmission device, and displaying said modified image on said one panel.

17. The method of claim 16, further comprising:

detecting an object obstructing said image or said corrected image on said one panel using at least one light sensor or weight sensor, transmitting image obstruction data corresponding to said panel to said central processing unit, generating a revised image using said central processing unit, transmitting said revised image from said central processing unit to said one panel via said data transmission device, and displaying said revised image on said one panel.

18. The method of claim 17, wherein said revised image includes at least one of a resized image, a relocated image and image data animation.

19. The method of claim 16, wherein said image display modification is correction of distorted images which occur due to overlapping or misalignment of said plurality of panels in a corner of said mobile image display system.

20. A mobile image display system, comprising:

a carousel frame;

a plurality of panels movable on said carousel frame, at least one of said plurality of panels including a video display;

a central processing unit;

a power supply providing power to at least one of said plurality of panels, the power supply device comprising a power rail disposed along at least one of a position of said carousel frame corresponding to an upper edge of said plurality of panels and a position of said carousel frame corresponding to a lower edge of said plurality of panels; and a data transmission device which communicates data between said central processing unit and at least one of said plurality of panels for sending image data thereto.

21. The mobile image display system of claim 20, wherein each of said plurality of panels further comprises an electrical pick-up which corresponds to said power rail.

22. The mobile image display system of claim 20, wherein said plurality of panels is divided into a plurality of groups of panels, wherein a first panel in one of said plurality of groups of panels further comprises an electrical pick-up which corresponds to said power rail, and wherein other panels in said one of said plurality of groups of panels are connected to said first panels in said one of said plurality of groups of panels via a wired connection.

23. The mobile image display system of claim 20, wherein the data transmission device is a wireless data transfer device which wirelessly transfers data between said central processing unit and each of said plurality of panels.

* * * * *